United States Patent [19]
Anderson

[11] Patent Number: 5,823,597
[45] Date of Patent: Oct. 20, 1998

[54] TRUCK BED EXTENDER

[76] Inventor: T. Thomas Anderson, 753 N. 16th St., Blair, Nebr. 68008

[21] Appl. No.: 912,696

[22] Filed: Aug. 18, 1997

[51] Int. Cl.$^6$ ..................................................... B62C 1/06
[52] U.S. Cl. ............................ 296/26.08; 296/3; 224/405
[58] Field of Search ............................... 296/26, 3, 26.08; 224/405

[56] References Cited

U.S. PATENT DOCUMENTS

| | | | |
|---|---|---|---|
| D. 252,677 | 8/1979 | Richardson, III | D12/98 |
| D. 291,789 | 9/1987 | Noga | D12/98 |
| D. 343,809 | 2/1994 | Cannon | D12/98 |
| 3,765,713 | 10/1973 | Suitt | 296/3 |
| 3,778,098 | 12/1973 | Tawara | 296/3 |
| 4,023,850 | 5/1977 | Tillery | 296/26 |
| 4,472,639 | 9/1984 | Bianchi | 296/26 |
| 4,475,760 | 10/1984 | Morgan | 296/26 |
| 4,509,787 | 4/1985 | Knaack et al. | 296/3 |
| 4,531,773 | 7/1985 | Smith | 296/26 |
| 4,544,196 | 10/1985 | Schmeichel et al. | 296/26 |
| 4,703,971 | 11/1987 | Schmeichel et al. | 296/26 |
| 4,778,213 | 10/1988 | Palmer | 296/26 |
| 4,856,840 | 8/1989 | Hanley | 296/26 |
| 4,951,991 | 8/1990 | Haigler | 296/26 |
| 5,328,225 | 7/1994 | Melching et al. | 296/26 |
| 5,423,587 | 6/1995 | Ingram | 296/3 |
| 5,439,152 | 8/1995 | Campbell | 224/405 |
| 5,451,088 | 9/1995 | Broad | 296/26 |
| 5,628,540 | 5/1997 | James | 296/3 |

*Primary Examiner*—Joseph D. Pape
*Attorney, Agent, or Firm*—Zarley, McKee, Thomte, Voorhees & Sease; Dennis L. Thomte

[57] ABSTRACT

A truck bed extender includes a receiver mounted at the forward end of the truck bed with a pair of trusses removably connected to the receiver and extending rearwardly beyond the length of the bed so as to cantilever rearwardly beyond the truck bed. Each truss has an upper member which slopes forwardly and downwardly from a rearward end, and a shim plate on the bottom surface of a length less than the length of the truck bed, to support the trusses on the truck bed. A cross-member is connected between the trusses to maintain them in spaced apart parallel relationship.

15 Claims, 4 Drawing Sheets

TRUCK BED EXTENDER

TECHNICAL FIELD

The present invention relates generally to apparatus attachable to the bed of a vehicle to extend the working length of the bed for long loads, and more particularly to an improved truck bed extender which is quickly and easily installed and removed from the vehicle and which alleviates weight on the tailgate of the vehicle.

BACKGROUND OF THE INVENTION

Apparatus attachable to the beds or frames of pickup trucks in order to increase the load carrying capacity of the truck bed are well known in the prior art. However, these prior art truck bed extenders suffer several problems.

First, the majority of the prior art truck bed extenders attach to the tailgate of a pickup truck to provide the extended load carrying capacity. However, the additional weight of an extended length load is preferably spread across the bed of the truck, and the vehicle frame, rather than on the tailgate of the vehicle, since the tailgate cannot provide the desired structural support for such loads.

Other prior art truck bed extenders are mounted directly to the vehicle frame and project rearwardly from the vehicle. However, such extenders are difficult and time consuming to install, and are not readily removable to permit normal functioning of the pickup truck.

A more recent development in truck bed extenders is disclosed in U.S. Pat. No. 5,451,088 to Robert Broad. This patent discloses a frame inserted in the box receiver hitch on the vehicle, which projects rearwardly to support the rearward end of a load projecting out the rear of the pickup truck. While the extender disclosed in the '088 patent is simple to install and remove, it requires that the vehicle have a box receiver hitch, and also accumulates the weight of the rearward end of the extended length load and directs it to the box on the receiver hitch. Preferably, the extended length load will have its weight spread more uniformly throughout the pickup truck bed.

SUMMARY OF THE INVENTION

It is therefore a general object of the present invention to provide an improved truck bed extender which is easily installed and removed from the bed of a vehicle, and which locates the weight of the extended length load along the entire length of the pickup truck bed.

A further object is to provide an improved pickup truck extender which alleviates the placement of weight of the load on the vehicle tailgate.

Still a further object of the present invention is to provide an improved truck bed extender which is easily attached and removed without tools.

These and other objects of the present invention will be apparent to those skilled in the art.

The truck bed extender of the present invention includes a receiver mounted at the forward end of the truck bed with a pair of trusses removably connected to the receiver and extending rearwardly beyond the length of the bed so as to cantilever rearwardly beyond the truck bed. Each truss has an upper member which slopes forwardly and downwardly from a rearward end, and a shim plate on the bottom surface of a length equal to the length of the truck bed, to support the trusses on the truck bed. A cross-member is connected between the trusses to maintain them in spaced apart parallel relationship.

DESCRIPTION OF THE PREFERRED EMBODIMENT

Figure 1:
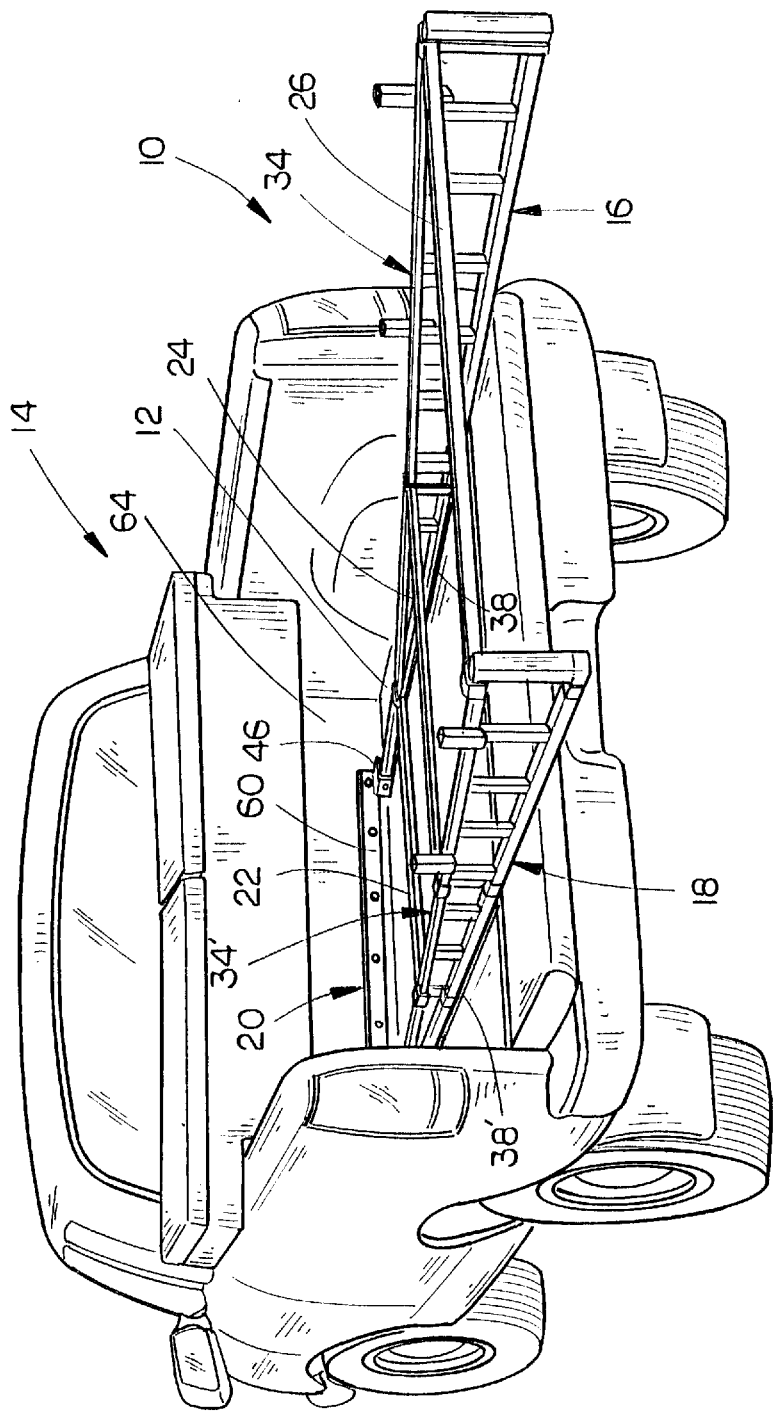
FIG. 1 is a perspective view of the truck bed extender of the present invention installed in a pickup truck.

Referring now to the drawings, in which similar or corresponding parts are identified with the same reference numeral and more particularly to FIG. 1, the truck bed extender of the present invention is designated generally at 10 installed on the bed 12 of a truck 14, and projecting rearwardly out the rearward end of the truck.

Figure 2:
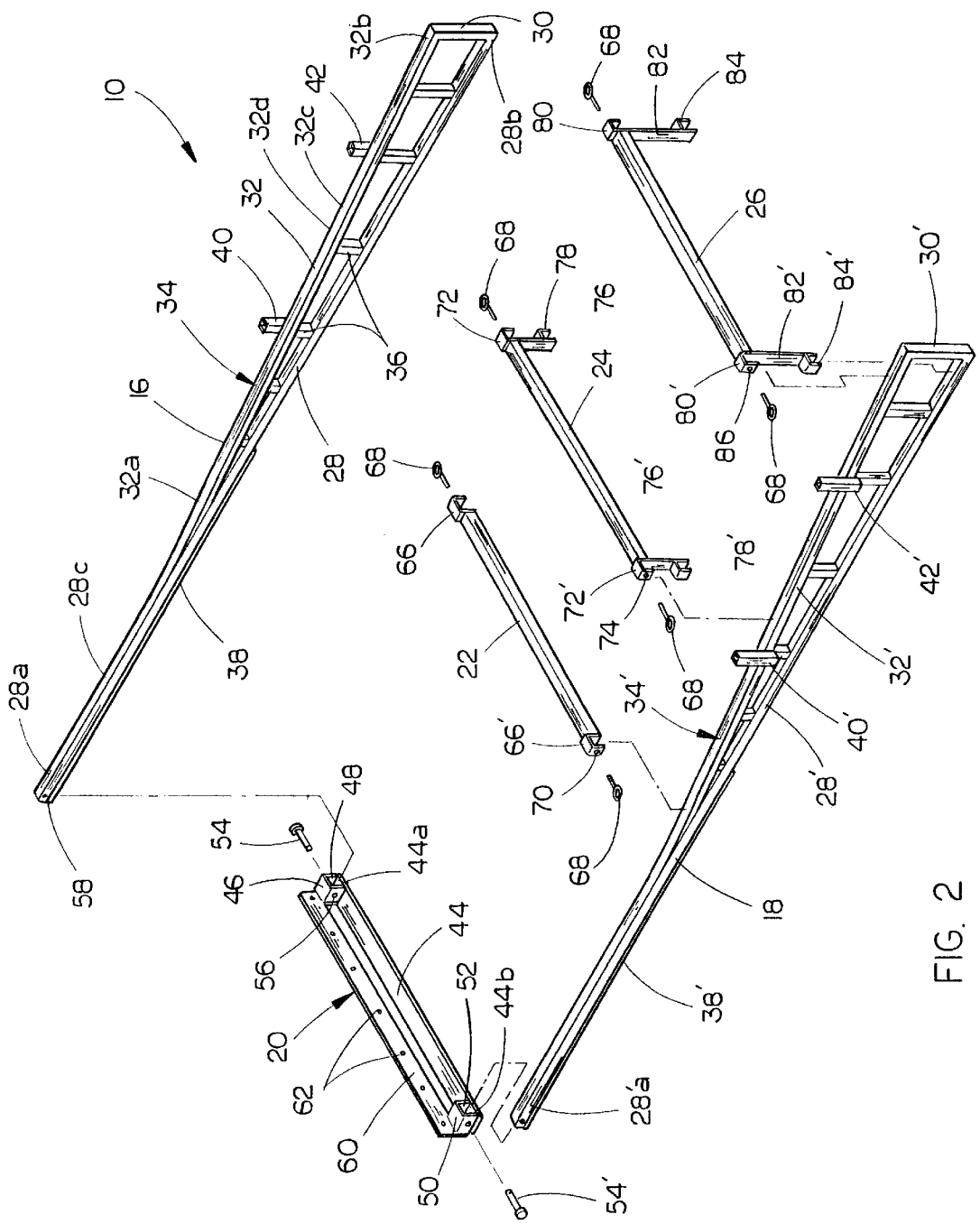
FIG. 2 is an exploded perspective view of the truck bed extender of the present invention.

Referring now to FIG. 2, the truck bed extender 10 includes a pair of elongated right and left trusses 16 and 18, a receiver 20, and forward, intermediate, and rear crossmembers 22, 24, and 26 respectively. Truss 16 includes an elongated base tube 28 having a forward end 28a and a rearward end 28b. An upwardly projecting leg 30 is mounted on the rearward end 28b of base tube 28 and supports the rearward end 32b of upper tube 32 thereon. Upper tube 32 slopes downwardly from the rearward end 32b atop leg 30 to its forward end 32a which is mounted to an upper surface of base tube 28 rearwardly of base tube forward end 28a. The upper surface 32c of upper tube 32 is ground to form a smooth interface with the upper surface 28c of base tube 28 proximal the forward end 28a thereof. Upper surfaces 28c and 32c form a support surface designated generally at 34, for supporting a load on truss 16.

A plurality of vertically oriented support bars 36 are provided at uniform intervals between upper tube 32 and base tube 28 to form truss 16. A shim plate 38 is mounted on the bottom surface of base tube 28, and extends rearwardly from the base tube forward end 28a a length slightly less than the length of the truck bed 12. A pair of receiver tubes 40 and 42 are mounted in a vertical orientation on the outward face 32d of upper tube 32. Receiver tubes 40 and 42 have a bottom (not shown) formed in the lower end thereof, and are opened at their upper ends, so as to receive a pipe therein, as described in more detail hereinbelow.

Left truss 18 is a mirror image of right truss 16, and will therefore not be described in detail herein. Left truss 18 includes a corresponding base tube 28', upper tube 32', rearward leg 30', shim plate 38', receiver tubes 40' and 42', and an upper support surface designated generally at 34'.

Receiver 20 includes a base plate 44 having opposing right and left ends 44a and 44b. An inverted U-shaped bracket 46 is affixed to the upper surface of the base plate right end 44a to form a pocket 48. Similarly, an inverted U-shaped bracket 50 is mounted atop base plate left end 44b to form a rearwardly extending pocket 52. Pockets 48 and 52 are dimensioned to receive the forward ends 28a and 28'a of trusses 16 and 18 therein. A pin 54 is journaled through a pair of coaxial apertures 56 in bracket 46 and an aperture 58 in the forward end of base tube 28 to selectively secure the forward end 28a of base tube 28 within pocket 48. Similarly, pin 54' will secure the forward end 28'a within pocket 52.

A mounting plate 60 is affixed to the forward ends of brackets 46 and 50, and extends in a vertical plane therebetween. A plurality of apertures 62 spaced uniformly along mounting plate 60 will receive bolts to fasten the mounting plate to the front wall 64 of the truck bed 12 (shown in FIG. 1).

Referring once again to FIG. 2, forward cross-member 22 includes right and left inverted U-shaped brackets 66 and 66' on the opposing right and left ends thereof. Brackets 66 and 66' are dimensioned to receive upper tubes 34 and 34' therethrough such that cross-member 22 is supported therebetween and maintains trusses 16 and 18 in spaced apart parallel relationship. Eye bolts 68 are threaded through a threaded aperture 70 formed in the outer leg of each bracket 66 and 66', such that the eye bolts will tighten against the outer surface of upper tubes 32 and 32' to serve as set screws and thereby fasten cross-member 22 in place.

Intermediate cross-member 24 includes inverted U-shaped brackets 72 and 72' affixed at the opposing ends thereof, for receiving upper tubes 32 and 32'. Eye bolts 68 are threaded into threaded apertures 74 in the outer legs of brackets 72 and 72' to secure intermediate cross-member in position.

Intermediate cross-member also includes a pair of depending legs 76 and 76', depending from the right and left ends of the cross-member, the lower end of legs 76 and 76' having an inverted U-shaped bracket 78 and 78' respectively. Brackets 78 and 78' are positioned and dimensioned to receive the base tubes 28 and 28' therein, respectively.

Rearward cross-member 26 is formed similar to intermediate cross-member 24, with opposing right and left inverted U-shaped bracket 80 and 80', opposing depending legs 82 and 82', and lower inverted U-shaped brackets 84 and 84'. Depending legs 82 and 82' are longer than legs 76 and 76', since the distance between upper tubes 32 and 32' and the corresponding base tubes 28 and 28' is greater at the rearward end of trusses 16 and 18. Eye bolts 68 are threaded through apertures 86 in the outer leg of brackets 80 and 80' to secure rearward cross-member in position.

As shown in FIG. 1, the forward ends of trusses 16 and 18 are secured in brackets 46 and 50 (not shown) in receiver 20. Trusses 16 and 18 are maintained in parallel spaced apart position by forward cross-member 22, intermediate cross-member 24 and rearward cross-member 26. The upper surfaces of cross-members 22, 24, and 26, in combination with the support surfaces 34 and 34' on trusses 16 and 18 will support a load which extends outwardly beyond the rear of truck 14. Shim plates 38 and 38' will support trusses 16 and 18 on the bed 12.

Figure 3:
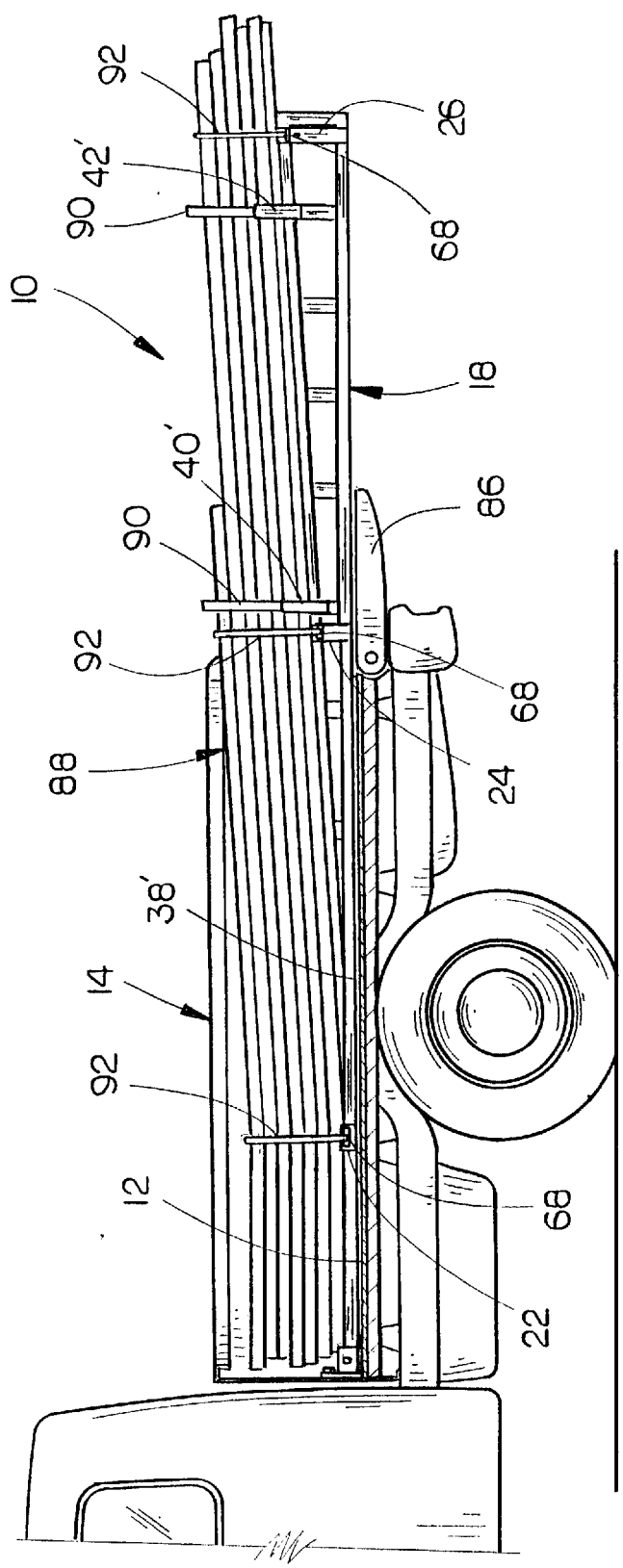
FIG. 3 is a side elevational view of the truck bed extender with an extended length load positioned thereon, and the side of the pickup truck removed to view the extender.
Figure 4:
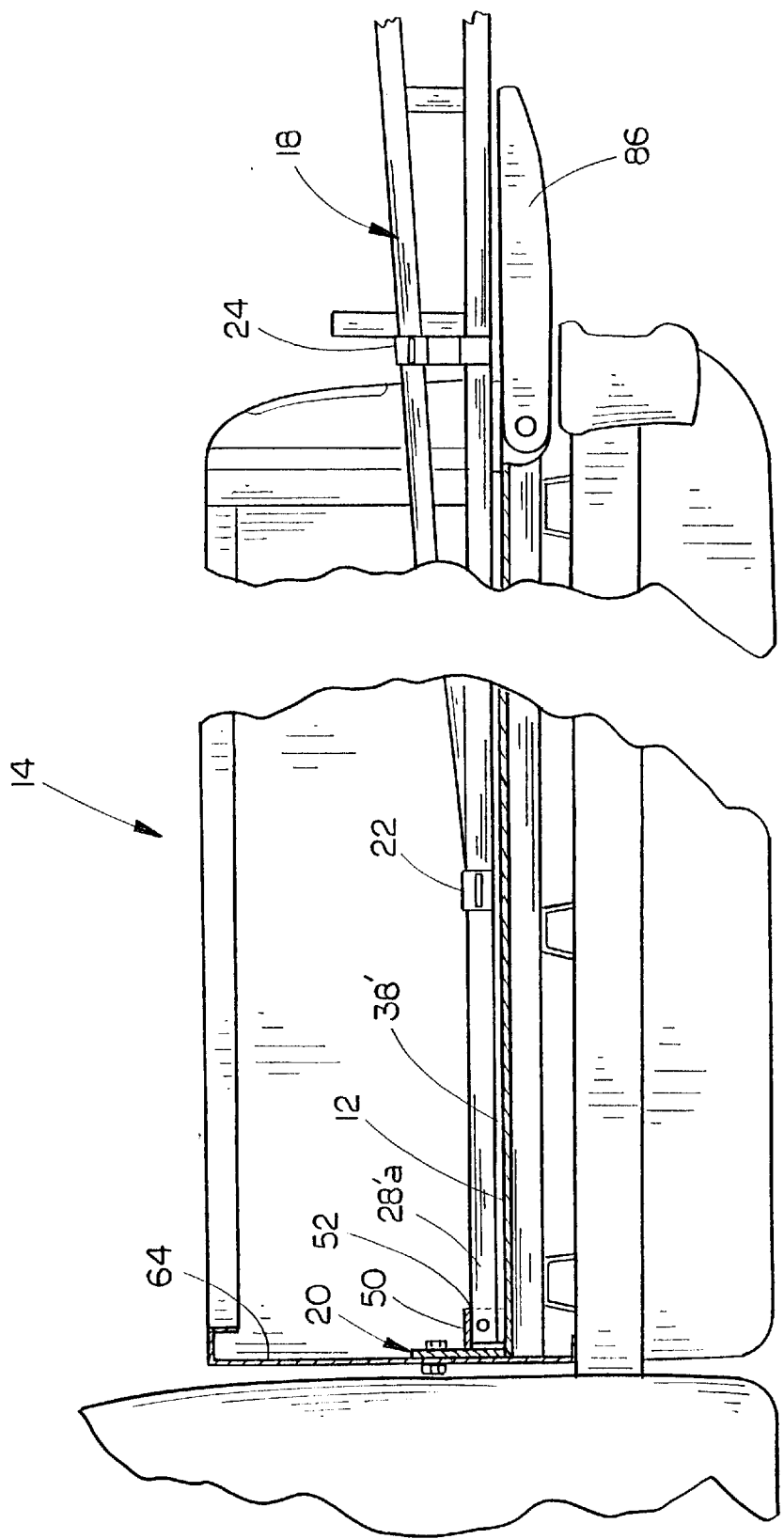
FIG. 4 is an enlarged sectional view through the truck bed showing the truck bed extender of the present invention.

Referring now to FIGS. 3 and 4, it can be seen that shim plates 38' extend along the length of truck bed 12, but end forwardly of the tailgate 86 of pickup truck 14. Shim plates 38 and 38' thereby support trusses 16 and 18 above the bed 12, and spaced above tailgate 86 to alleviate weight on tailgate 86.

Referring more specifically to FIG. 4, receiver 20 is shown bolted to the bed front wall 64 with the forward end 28'*a* of truss 18 secured within pocket 52 of bracket 50. The rearward end of truss 18 is supported on truck bed 12 along the entire length of shim plate 38', with the rearward end of truss 18 cantilevered rearwardly out of the rearward end of truck 14.

FIG. 3 shows a load of lumber designated generally at 88 having a length greater than the length of the truck bed 12. Pipes 90 are journaled within receiver tubes 40' and 42' to prevent lateral movement of the lumber load 88 on the truck bed extender 10. The eye bolts 68 utilized to secure cross-members 22, 24, and 26 are further utilized to attach securement straps 92 over the top of the lumber load 88, to secure the load on the truck bed extender 10.

The use of trusses 16 and 18 which slope downwardly and forwardly serve two purposes. First, the truss provides greater strength to resist downwardly deflection of the rearward end of the trusses when a load is applied along the truss and the rearward end is cantilevered rearwardly out of the truck. The truss shape provides superior deflection resistance when compared to a single solid bar or a single elongated tubular member. Second, the forward and downward slope of the truss resists rearward movement of the load 88 on the trusses 16 and 18 thereby reducing the chance of the load sliding off the rearward end of the truck bed extender 10. Thus, while the trusses 16 and 18 may be flat, solid members, it is preferred that they have an open-truss, triangular configuration.

Truck bed extender 10 is also easily inserted and removed from a truck 14 without the need for tools. Once receiver 20 is bolted to the truck front wall 64, tools are not needed to install and remove the remainder of the truck bed extender. Eye bolts 68 are easily turned with the fingers to secure the cross-members in position and the trusses are removed from the receiver 20 simply by removing the pins 54 and 54'.

Whereas the invention has been shown and described in connection with the preferred embodiment thereof, many modifications, substitutions and additions may be made which are within the intended broad scope of the appended claims.

I claim:

1. Apparatus for supporting long length loads on a truck bed, comprising:

an elongated support member with forward and rearward ends and an upper support surface for supporting a load thereon;

said elongated support member including a first truss having an elongated base member with forward and rearward ends, at least one upwardly projecting leg on the rearward end of the base member, and an elongated upper member connected at a rearward end to an upper end of the leg;

a receiver having means for attaching the receiver to a truck bed, and means for removably connecting the support member thereto;

said means for attaching the receiver to a truck bed including an elongated mounting plate having first and second ends;

said means for removably connecting the forward end of the truss base member being located at the receiver first end;

a second truss having an elongated base member with forward and rearward ends, at least one upwardly projecting leg on the rearward end of the base member, and an elongated upper member connected at a rearward end to an upper end of the leg;

said second truss upper member having an upper support surface for supporting a load thereon;

means on the receiver second end for removably connecting the forward end of the second truss base member thereto;

a cross-member connected between the first and second trusses, rearwardly of the receiver, to maintain the trusses in spaced apart parallel relation; and the first truss being connected at a forward end to the receiver.

2. The apparatus of claim 1, wherein said elongated upper members of the first and second trusses are connected at their forward ends to their respective base members, such that the upper members slope forwardly and downwardly from their rearward ends to their forward ends.

3. The apparatus of claim 1, wherein said first and second truss base members have flat, generally co-planar bottom surfaces, and further comprising:
a first shim plate mounted on the bottom surface of the first truss base member, extending rearwardly from the forward end less than the entire length of the base member; and
a second shim plate mounted on the bottom surface of the second truss base member, extending rearwardly from the forward end less than the entire length of the base member.

4. The apparatus of claim 3, wherein:
said means for removably connecting the first truss to the receiver being of a type permitting connection and disconnection without the use of tools;
said means for removably connecting the second truss to the receiver being of a type permitting connection and disconnection without the use of tools; and
said cross-member having first and second ends and means at the first and second ends for removably connecting the cross-member to the trusses.

5. The apparatus of claim 4, wherein the first truss upper member forward end is connected to the first truss base member rearwardly of the forward end of the base member, and wherein the second truss upper member forward end is connected to the second truss base member rearwardly of the forward end of the base member.

6. The apparatus of claim 5, wherein the means for connecting the cross-member first and second ends to the trusses includes means for selectively securing and releasing the cross member ends to the respective trusses without the use of tools.

7. The apparatus of claim 6, further comprising:
a first receiver tube mounted in a generally vertical orientation to the first truss, said first receiver tube having an open upper end to selectively receive a pipe therein; and
a second receiver tube mounted in a generally vertical orientation to the second truss, said second receiver tube having an open upper end to selectively receive a pipe therein;
whereby pipes journaled within the receiver tubes will project upwardly to provide a transverse stop for a load on the apparatus.

8. The apparatus of claim 1, wherein:
said means for removably connecting the first truss to the receiver being of a type permitting connection and disconnection without the use of tools;
said means for removably connecting the second truss to the receiver being of a type permitting connection and disconnection without the use of tools; and
said cross-member having first and second ends and means at the first and second ends for removably connecting the cross-member to the trusses.

9. The apparatus of claim 1, wherein the first truss upper member forward end is connected to the first truss base member rearwardly of the forward end of the base member, and wherein the second truss upper member forward end is connected to the second truss base member rearwardly of the forward end of the base member.

10. The apparatus of claim 9, wherein the means for connecting the cross-member first and second ends to the trusses includes means for selectively securing and releasing the cross member ends to the respective trusses without the use of tools.

11. Apparatus for supporting long length loads on a truck bed, comprising:
an elongated support member with forward and rearward ends and an upper support surface for supporting a load thereon;
said elongated support member includes a flat bottom surface, and further includes a first shim plate mounted on the bottom surface extending rearwardly from the forward end less than the entire length of the base member; and
a receiver having means for attaching the receiver to a truck bed, and means for removably connecting the support member thereto.

12. In combination:
a vehicle having a bed for carrying a load of material, the bed having an upper surface, a length extending from a forward to a rearward end, and opposing sides; and
an apparatus removably mounted to the bed for supporting a load having a length longer that the length of the bed, including:
an elongated support member with forward and rearward ends and an upper support surface for supporting a load thereon;
said elongated support member including a first truss having an elongated base member with forward and rearward ends, at least one upwardly projecting leg on the rearward end of the base member, and an elongated upper member connected at a rearward end to an upper end of the leg;
said support member having a length longer than the length of the bed, and having an upper support surface for supporting a load thereon; and
a receiver connected to a forward end of the bed and having means for removably connecting the forward end of the support member thereto.

13. The combination of claim 12, wherein said receiver includes an elongated mounting plate having first and second ends, said means for removably connecting the forward end of the first truss base member being located at the receiver first end, and further comprising:
a second truss having an elongated base member with forward and rearward ends, an upwardly projecting leg on the rearward end of the base member, and an elongated upper member connected at a rearward end to an upper end of the leg;
said second truss having a length longer than the length of the bed, and said second truss upper member having an upper support surface for supporting a load thereon;
means on the receiver second end for removably connecting the forward end of the second truss base member thereto; and
a cross-member connected between the first and second trusses, rearwardly of the receiver, to maintain the trusses in spaced apart parallel relation.

14. The combination of claim 13, further comprising:
a first shim plate mounted on the bottom surface of the first truss base member and extending rearwardly therefrom a length equal to the length of the bed, for supporting the first truss on the bed with the rearward end of the truss cantilevered rearwardly beyond the bed;

a second shim plate mounted on the bottom surface of the second truss base member, extending rearwardly from the forward end a length equal to the length of the bed, for supporting the second truss on the bed with the rearward end of the second truss cantilevered rearwardly beyond the bed.

15. The combination of claim 14, wherein:

said means for removably connecting the first truss to the receiver being of a type permitting connection and disconnection without the use of tools;

said means for removably connecting the second truss to the receiver being of a type permitting connection and disconnection without the use of tools;

said cross-member having first and second ends and means at the first and second ends for removably connecting the cross-member to the trusses;

said means for connecting the cross-member first and second ends to the trusses including means for selectively securing and releasing the cross-member ends to the respective trusses without the use of tools.

* * * * *